United States Patent [19]

Bellapadrona

[11] Patent Number: 4,687,187
[45] Date of Patent: Aug. 18, 1987

[54] OLEOPNEUMATIC SUSPENSION FOR VEHICLES, SUITABLE IN PARTICULAR FOR MOTORCYCLES

[76] Inventor: Silvano Bellapadrona, No. 15, Via dei Colli della Serpentara, 00139 Rome, Italy

[21] Appl. No.: 748,284

[22] Filed: Jun. 24, 1985

[30] Foreign Application Priority Data

Jul. 5, 1984 [IT] Italy ............................... 48510 A/84

[51] Int. Cl.⁴ ................................................. F16F 9/19
[52] U.S. Cl. ................................. 267/64.18; 188/314
[58] Field of Search ............... 267/64.11, 64.15, 64.19, 267/64.21, 64.23, 64.24, 64.25, 64.28, 122, 129, 64.27, 119; 188/313, 314, 322.14, 322.16, 322.17, 322.18, 322.19, 322.21; 277/165; 403/50, 51; 92/98 D; 138/30

[56] References Cited

U.S. PATENT DOCUMENTS

| | | | |
|---|---|---|---|
| 1,780,531 | 11/1930 | Messier | 267/64.15 X |
| 2,564,790 | 8/1951 | Orloff et al. | 267/64.28 X |
| 2,774,446 | 12/1956 | de Carbon | 267/64.11 X |
| 2,914,089 | 11/1959 | Allinquant | 267/64.27 X |
| 3,112,923 | 12/1963 | Ley | 267/64.25 X |
| 3,268,235 | 8/1966 | Jacobellis | 277/165 |
| 3,726,517 | 4/1973 | Lutz | 267/64.23 |
| 4,447,047 | 5/1984 | Newell | 267/119 |

FOREIGN PATENT DOCUMENTS

| | | | |
|---|---|---|---|
| 1013975 | 8/1957 | Fed. Rep. of Germany | 188/314 |
| 2017215 | 10/1979 | United Kingdom | 138/30 |

*Primary Examiner*—Duane A. Reger
*Attorney, Agent, or Firm*—Beveridge, DeGrandi & Weilacher

[57] ABSTRACT

An oleopneumatic suspension for motorcycles and other vehicles includes, on opposite sides of a piston, a first reservoir for a gaseous fluid and a second reservoir for a liquid. An oil tight elastic separation member separates the second reservoir from a third reservoir which contains a gaseous fluid. A partition in the second reservoir has a unidirectional valve which permits liquid to flow away from the piston, and the partition has a return duct of adjustable cross-section for liquid flow toward the piston.

5 Claims, 1 Drawing Figure

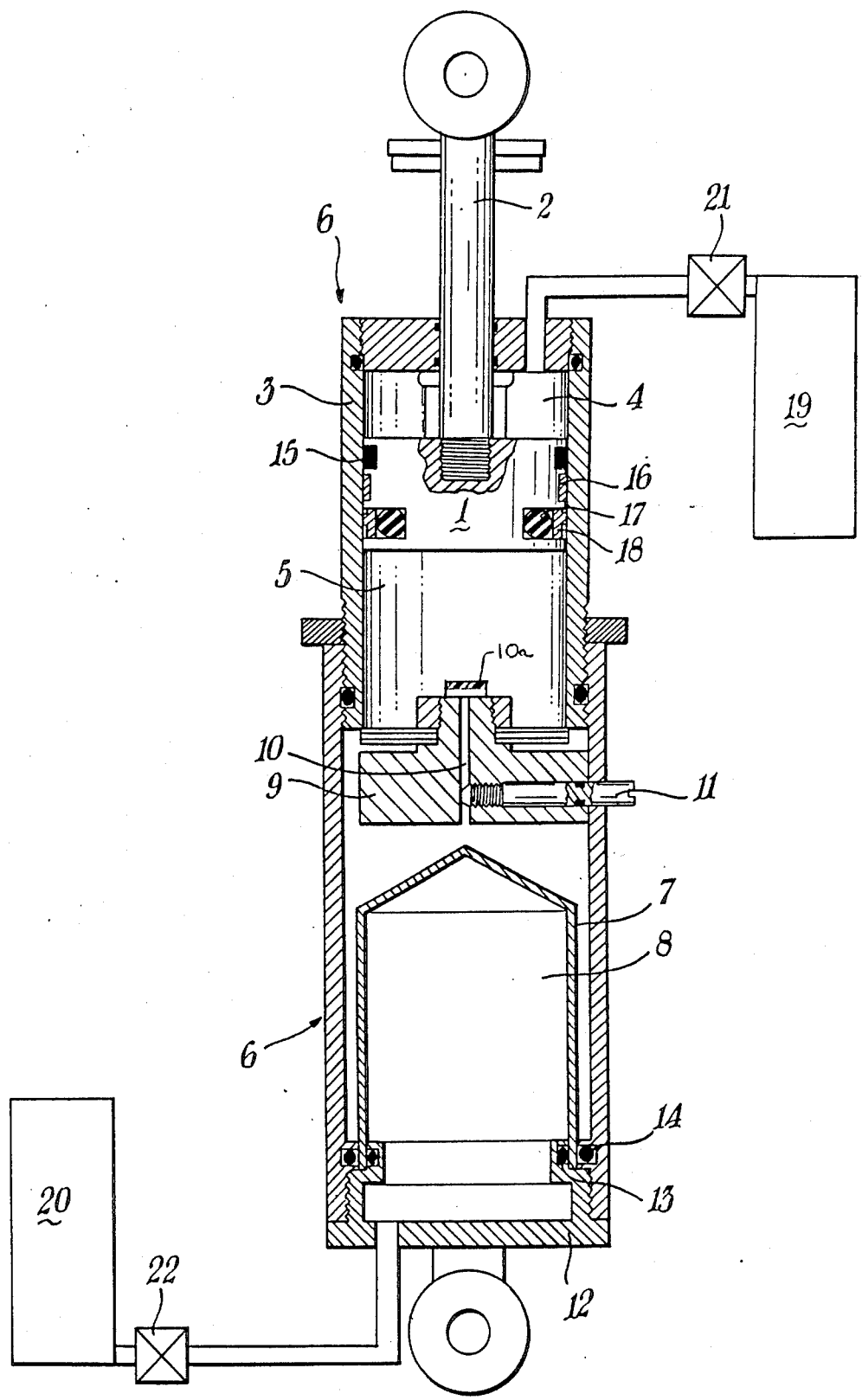

OLEOPNEUMATIC SUSPENSION FOR VEHICLES, SUITABLE IN PARTICULAR FOR MOTORCYCLES

The present invention relates to an oleopneumatic suspension generally suitable for vehicles and in particular for motorcycles. More particularly, the present invention relates to an oleopneumatic suspension that, because of its functional and structural features, can be employed with best results in any vehicle, including high performance vehicles, and in particular in racing motorcycles.

As it is well known, commercial suspensions at the present time make use of a shock absorbing system which is made up of hydraulic means whose action is integrated by means of springs or the like.

It is evident that said means do not allow an optimal possibility of adjusting the sensitivity of the suspension, and as a consequence of its full bump position, because of the presence of the springs. Moreover, in case an adjustment system is provided, said adjusting operations cannot be carried out with ease especially when the vehicle itself is employed.

Thus, it is an object of the present invention to provide a suspension whose optimal performance can be assured during its employment so that the suspension itself can be advisably employed in racing vehicles and particularly in racing motorcycles.

It is further object of the present invention to provide adjusting means for the adjustment of the axial stiffness of the suspension, said means being easy to use and offering a wide and multiple possibility of adjustment.

Moreover, the suspension according to the present invention, as a result of its structural features, is also undoubtedly lighter than other types of suspensions commercially available at the present time.

Hence it is a specific object of the present invention an oleopneumatic suspension that is generally suitable for vehicles and in particular for motorcycles, said suspension being characterized in that it comprises first reservoir means for air or for other gaseous fluid, piston means, second reservoir means for oil, unidirectional valve means for the passage of oil into said second reservoir means for oil by the action of said piston means, an oil return duct in the upward direction during the return stroke of the piston, said duct being provided through said unidirectional valve means, and being supplied with means for adjusting the oil passage port or for braking adjustment, and third reservoir means for air or other gaseous fluid, said third reservoir means being separated from said second reservoir means by an oil tight elastic separation member.

According to a preferred embodiment of the present invention, reservoir means are provided for storage as well as two-position valve means for the regulation of the pressure of said gaseous fluid, upstream said first reservoir means and downstream said third reservoir means.

Further according to the present invention, instead of said first reservoir means for air, spring means performing the same functions can be advantageously provided.

According to a preferred embodiment of the present invention, a non-return unidirectional valve is provided on said oil return duct, so as to allow said oil to pass from the bottom upwards only.

According to a particularly preferred embodiment of the suspension of the present invention, gasket means are provided both at the top and at the bottom of said piston means, in order to assure a perfect pneumatic seal in the upper part of the piston means and a hydraulic seal in the lower part of the same, said gasket means being made up of a first inside rubber O-ring, lodged within a seat obtained on said piston, as well as of a second outside ring made up of a low friction material.

Further according to the present invention said oil tight elastic separation means can advantageously be made up of a diaphragm.

According to the present invention, said diaphragm is preferably secured to the lower part of the body of said suspension by means of two rubber fastening rings that assure both the oil and the air seal.

The present invention will be disclosed now for illustrative but not limitative purposes with particular reference to the FIGURE shown in the enclosed drawing, said FIGURE illustrating a vertical cross-sectional schematic view of the suspension according to the present invention.

In the FIGURE, the piston 1 is shown with its rod 2. Said piston runs within the steel cylinder 3.

Thus, two reservoirs 4 and 5 are formed, respectively above and below said piston 1. Moreover, a third reservoir 8 for air is formed by interposing the diaphragm 7 below said reservoir 5 and inside the suspension 6.

Said reservoir 5 is obstructed, in the terminal part of the cylinder 3 by a unidirectional valve 9 allowing the passage from the top towards the bottom only, by the action of the piston 1. A duct 10 is provided centrally on said valve 9, for the passage of the oil in the inverse direction by the action of the pressure of compressed air contained in the reservoir 8, a braking adjustment means 11 being provided on said duct 10. This duct may also be provided with a non-return unidirectional valve flapper 10a which allows oil to flow upwardly toward the piston 1.

As it is evident from the enclosed drawing, the diaphragm 7 is secured to the lower plug 12 of the suspension 6 by means of two O-ring gaskets 13 and 14 that assure a good seal both as regards oil and air.

On said piston 1 seal gaskets 15 are provided on the upper part, as well as, at an intermediate level, a synthetic material guiding ring 16 for preventing any impurities from being introduced, whereas in the lower part of the piston a synthetic rubber O-ring gasket 17 and an outside ring 18 made up of a low friction material are lodged within a suitable seat obtained on the piston 1.

Reservoirs 19 and 20 for air are provided respectively upstream and downstream said reservoirs 4 and 8, said reservoirs 19 and 20 allowing the variation of the stiffness of the suspension 6 by means of the two-position valves 21 and 22, so that the control is obtained of the suspension performance.

When the suspension 6 is stressed downwards, the piston 1 slides downwards and compresses the oil contained within the reservoir 5 so as to pass the same through the valve 9. Thus, the oil acts on the diaphragm 7 and compresses the air contained within the reservoir 8.

When the stress on the suspension 6 is relieved, the air contained within the reservoir 8 pushes the oil upwards by means of the pressure of the diaphragm 7. The oil, passing through the duct 10, pushes the piston 1 upwards, also as a result of the lower pressure formed in the reservoir 4 with respect to the pressure within the reservoir 8.

The reservoir chambers 19 and 20, that can perform their actions independently of each other, allow to select a value of the axial stiffness of said suspension as explained above by means of the two-position valves 21 and 22.

The present invention has been disclosed according to some of its preferred embodiments, but it is to be understood that modifications and changes can be introduced in the same by those who are skilled in the art without departing form the scope of the invention.

What is claimed is:

1. An oleopneumatic suspension which is generally suitable for vehicles and in particular for motorcycles, said suspension comprising a piston means, first reservoir means and second reservoir means located on opposite sides of said piston means, said first reservoir means containing air or other gaseous fluid, said second reservoir means containing oil, unidirectional valve means in said second reservoir means for the passage of oil within said second reservoir means in response to movement of said piston means toward said second reservoir means, an oil return duct means extending through the valve means for permitting oil to flow through the valve means toward the piston means in response to movement of the piston means toward the first reservoir means, means for adjusting the cross section of the oil return duct means, and third reservoir means for air or other gaseous fluid, said third reservoir means being separated from said second reservoir means by an oil tight elastic separation member; said oleopneumatic suspension having storage reservoir means and two-position valve means for regulating the pressure of said gaseous fluid, said storage reservoir means and said two position valve means being provided upstream of said first reservoir means and downstream of said third reservoir means.

2. An oleopneumatic suspension according to claim 1 having storage reservoir means and two-position valve means for regulating the pressure of said gaseous fluid, said storage reservoir means and said two position valve means being provided upstream of said first reservoir means and downstream of said third reservoir means.

3. An oleopneumatic suspension according to claim 1 having a second non-return unidirectional valve means provided on said oil return duct means, said second non-return valve means allowing the passage of oil toward the piston means only.

4. An oleopneumatic suspension according to claim 1, characterized in that said oil tight elastic separation member is made up of a diaphragm.

5. An oleopneumatic suspension according to claim 4 having two rubber fastening rings which connect the diaphragm to the suspension to provide an oiltight and airtight seal.

* * * * *